Figure 4:
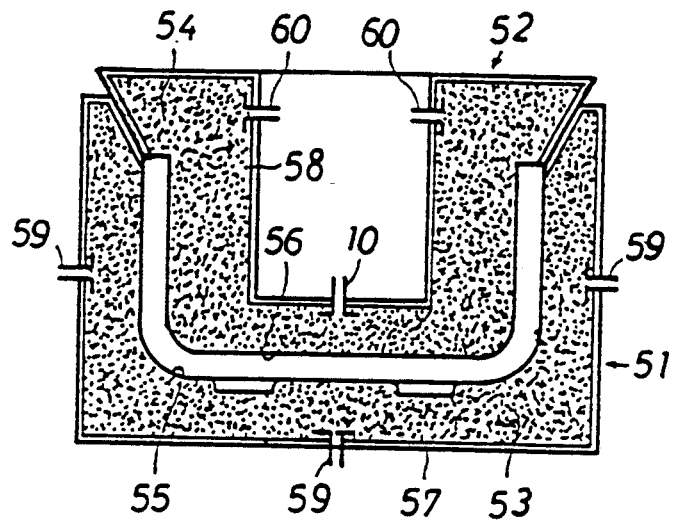

United States Patent [19]

Hirzel

[11] Patent Number: 5,061,427
[45] Date of Patent: Oct. 29, 1991

[54] MOLD BODY FOR THE DEEP DRAWING OF FOILS AND FOR CASTING OF STRUCTURAL MATERIALS

[76] Inventor: Theodor Hirzel, Hasenbergstrasse 402, 8967 Widen, Switzerland

[21] Appl. No.: 301,755

[22] PCT Filed: Apr. 8, 1988

[86] PCT No.: PCT/CH88/00074
§ 371 Date: Jan. 23, 1989
§ 102(e) Date: Jan. 23, 1989

[87] PCT Pub. No.: WO88/07921
PCT Pub. Date: Oct. 20, 1988

[30] Foreign Application Priority Data
Apr. 9, 1987 [CH] Switzerland .................. 1365/87

[51] Int. Cl.⁵ .......................................... B29C 33/38
[52] U.S. Cl. ................................. 264/219; 249/135; 249/158; 419/2
[58] Field of Search ............... 264/510, 511, 512, 516, 264/544, 553, 219, 250, 299, 313, 316, 63; 249/112, 115, 135, 140, 139, 155, 158, 141; 425/388; 419/1, 2, 10, 35

[56] References Cited

U.S. PATENT DOCUMENTS

| 3,166,615 | 1/1965 | Farrell . | |
|---|---|---|---|
| 3,353,219 | 11/1967 | Snyder . | |
| 3,474,497 | 10/1969 | Watts, Jr. | 425/388 |
| 3,755,213 | 8/1973 | Kendall et al. | 264/331.12 |
| 3,955,266 | 5/1976 | Honami et al. | 425/388 |
| 4,125,351 | 11/1978 | Alfter et al. . | |
| 4,631,228 | 12/1986 | Kruger | 264/279 |
| 4,714,424 | 12/1987 | Kinugasa et al. | 425/388 |

FOREIGN PATENT DOCUMENTS

| 121929 | 10/1984 | European Pat. Off. . |
|---|---|---|
| 1604539 | 11/1970 | Fed. Rep. of Germany . |
| 3132437 | 3/1983 | Fed. Rep. of Germany . |
| 3723021 | 11/1989 | Fed. Rep. of Germany . |
| WO87/02304 | 4/1987 | PCT Int'l Appl. . |
| 514412 | 12/1971 | Switzerland . |
| 617914 | 6/1980 | Switzerland . |

Primary Examiner—Jill L. Heitbrink
Attorney, Agent, or Firm—Fay, Sharpe, Beall, Fagan, Minnich & McKee

[57] ABSTRACT

The mold body consists of a mechanically workable, porous material. This allows to provide complicated shapes without suffering a loss of quality of the deep drawn foil. Due to the mechanical working it is also possible to provide different exchangeable inserts (15, 16 and 17) with individual shape determining mold face surfaces.

7 Claims, 3 Drawing Sheets

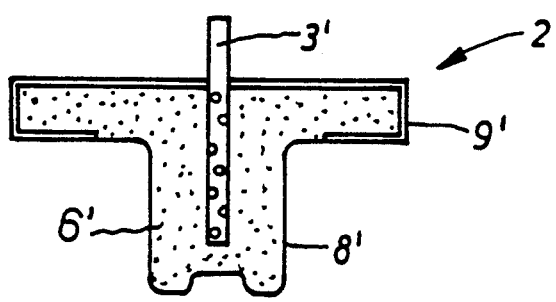
Fig.1
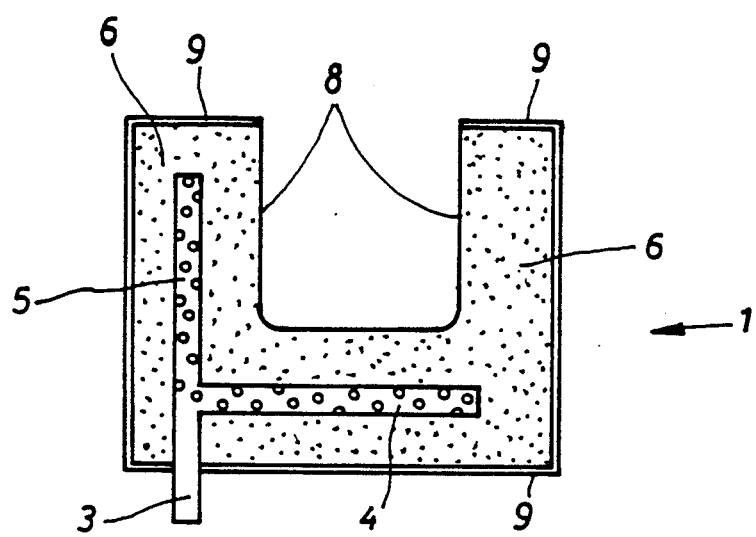
Fig.2
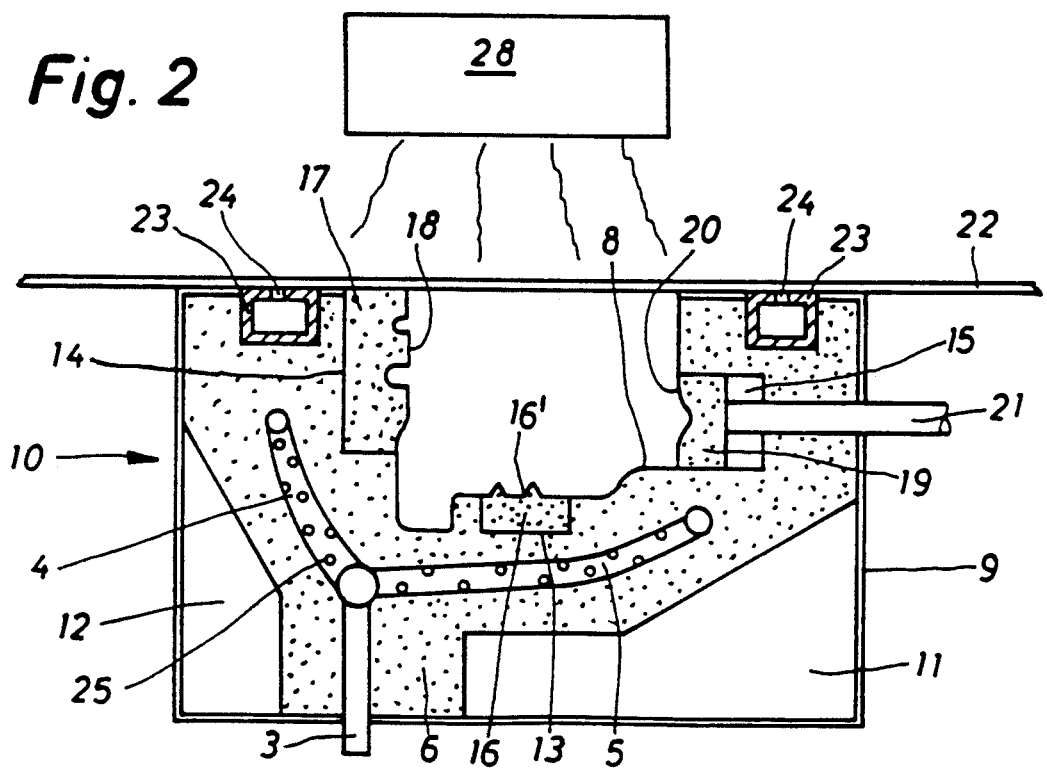

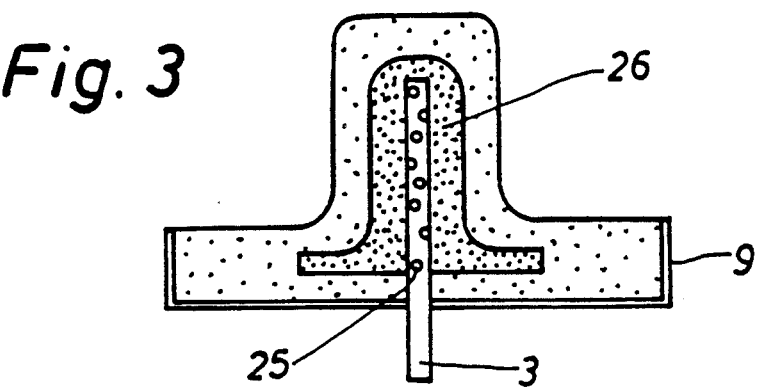
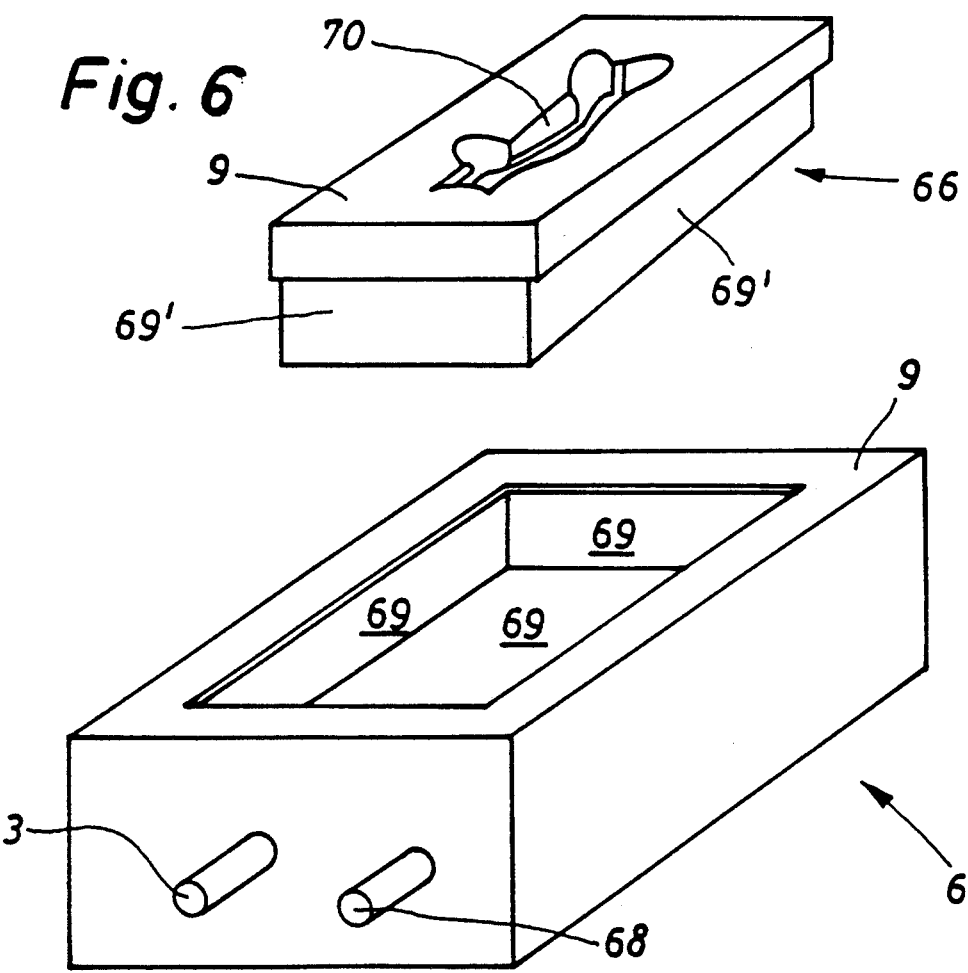

MOLD BODY FOR THE DEEP DRAWING OF FOILS AND FOR CASTING OF STRUCTURAL MATERIALS

The invention relates to a mold body and to a method for producing same.

The possibilities of the application for such mold bodies lie in the field of deforming foils, specifically plastic foils, of the deep drawing of foils as such, such for instance for blister packagings and similar, or also at molding masses to be cast, for which a temperature during the casting and the setting which does not damage the foil placed as separating means, specifically about 250° C., is not exceeded. A main field of application encompasses the production of cast parts of materials containing plastic materials, specifically such which contain grit or granulated material, but also cementitious bound or water soluble casting masses.

The numerous possibilities of application of deep drawn foil sections or of cast, settable structural pieces of materials having in part a plastic material content are known. Materials having a content partly of a plastic material which may be mentioned are specifically compound materials of granulated material and binding materials out of plastic materials, foamed materials, gypsum and similar which are materials which set by a chemical process. Here the granules of the granulated material may be metallic or nonmetallic and can have a diameter of a few micrometers up to more than 4 mm. Such as will be explained more in detail further below, the main application of the mold body in accordance with the invention is the casting of polymer concrete or polymer mortar where a deep drawn plastic foil is used as separating means layer.

Specifically for the production of cast bodies of the above mentioned materials a known method is to soften foils by heat and to press them pneumatically onto a shape giving surface. This may be arrived at by a subatmospheric pressure generated in the mold itself and/or by a positive pressure acting from the outside.

In order to practice this method mold bodies are applied which include specifically at the contours of the surface giving the shape which are critical regarding the deforming fine holes (jets). As a rule these mold bodies are produced of massive plastic material, also from metal (aluminum, steel) and the necessary holes or jets, respectively, are drilled into the mold body. Because a broad and continuously developing field of application is arising for cast bodies of e.g. structural material containing plastic material the mixtures of such structural materials and the corresponding mixing machines have been developed further steadily. It is here remarkable that until today no substantial progress has been attained regarding the molds themselves and correspondingly the main obstacles regarding an economical production of cast bodies of a material containing plastic material are at the mold itself.

The molding tools used up to this date have the following drawbacks:

The optimal placing, density and producing of the bores for the necessary holes or jets, respectively, demand much experience; an optimizing is often possible only by practical tests. The producing of a mold body is quite intrinsic, mistakes in the mold body cannot be corrected later. Furthermore, the mold bodies of plastic material heat speedily at a repeated deep drawing of foils and thus limit the station times; this is also true in case of metal molds. In addition, the making of the mold bodies is intrinsic, specially in case of complicated contours of the mold; the costs for the individual pieces in case of mold bodies made of several pieces cannot be reduced decisively. A specific drawback which has an impact is that very fine contours in the shaping surface and special structures of surfaces can hardly be realized or then only by means of a large number of holes which are difficult to place. As a rule, it is not possible to attain a complete and errorless deep drawing of the foil down onto the shape giving surface in order to have the form giving surface impeccably produced on the foil. Accordingly, not only the shape determining character of the foil is insufficient; the foil itself is, furthermore, not held impeccably on the shape giving surface.

It is thus the object of the present invention to overcome the above described drawbacks and to provide a mold body which allows an impeccable deep drawing of foils in an economical way and allows specifically an imaging of fine and finest structures at small tolerances. Thereby structures which are not wanted shall be avoided. Furthermore, it shall be possible to deep draw foils to minutely structured and complex shapes. These features shall, furthermore, be able to be maintained upon a mechanical working of the mold body.

For the use when casting of mold materials the problems which arise due to the contraction and shrinking of castable materials containing plastic material shall be overcome in an economical way.

This object is met by a mold body in accordance with the present invention as well as by a method for the production of same as described hereinbelow.

The mold body in accordance with the invention possesses means for an exchange of gas through the pores of its shape giving surface such that the foils can be drawn or pressed, respectively, pneumatically against its shape giving surface.

Due to the fact, that the shape giving surface is provided completely and evenly with pores, the foil held at a certain temperature can be Pressed completely and uniformly within seconds against the shape giving surface. This allows now that the foil will lie impeccably onto all contours of the shape giving surface.

For high quality products a mold body must have the same quality. It quite often happens that in case of complicated structures or shapes of structural bodies, respectively, it is not possible to produce an impeccable shape giving surface having sufficiently small tolerances in the first instance. A corresponding scrap of produced mold bodies is the result thereof. Because the mold body in accordance with the invention may be mechanically machined or worked later due to its specific composition of materials, the solution for the production of mold bodies of a highest quality specifically with regard to the dimensions true to measurements is provided. By means of a first deep drawn section of a foil or cast structural body undesirable deviations of the production may be recognized and a corresponding later working of the mold body may then be performed. This later working can be made by arbitrary measures, e.g. by drilling, machining or grinding. This possibility of a mechanical later working is a surprising effect of the composition of the material of the mold body in accordance with the invention. Commonly known porous bodies consisting of a granular material and a plastic material binder reveal mainly upon a mechanical working two effects: 1. a clogging of the pores along the surface being cut due to the smudging of the binder of the plastic material and 2. small particles of material are torn out of the surface being cut such that this surface is no longer impeccably smooth. The above described properties of the surface giving the shape as well as the mold body as much as it is produced from this material are safely arrived at if a fine granulated material or grit is used with substantially no contents of dust. By means of such a clogging of the pores is prevented. Furthermore, an optimum between the bulk density and strength obtainable therewith and smoothness of the surface on the one hand and a sufficient porosity for the through flow on the other hand must be found. This is arrived at in that an average grain size within a certain band width is made use of. In a preferred embodiment the granulated material consists of a grain size mixture of 450 $\mu$m, according to a further embodiment of 45–160 $\mu$m. In case of severest demands made to the shape giving surface of the mold body it is possible to use grain sizes of below 40–45 $\mu$m; because, however, it is possible only to strain such to be completely free of dust particles by large expenditures, the use thereof is reserved for special cases only. Decisive is, that no grains having a diameter below 10 $\mu$m are present in the granulated material because they belong to the dust components of such granulated material.

It is furthermore important that the granulated material consists of grains having a complex shape. By means of such, pores still remain open also in case of a high bulk density. The ideal case is to use a granulated material of a blasted or torn material, specifically metal. Aluminum may be used because such has a low weight and can be machined easily; steel, which costs less, is however prone to an oxidizing and is heavy; copper, which incorporates a high temperature conductivity but is, however, expensive.

The granulated material must be mixed initially together with a liquid binding agent which, however, sets after the processing. This binding agent consists of a synthetic resin. This avoids during a later mechanical working the danger of tearing particles of material out of the cut or worked, respectively, surface. Epoxy resins have been proven to be specifically reliable regarding this use.

The mixture consisting of the granulated material and binding agent should be a so-called "dry mixture". This is to be understood such that after a thorough mixing ideally every grain of the granulated material is covered by a thin film of the binding agent only and that, for instance, in cavities of the complexly shaped granulated material no free binding agent exists any longer. This also avoids effectively a clogging of the pores.

Such a mixture consists if e.g. 83 parts by weight of granulated aluminum having grains of 45–160 $\mu$m are mixed with 17 parts per weight epoxy resin.

The inventive mold body consisting of the above described materials can be produced substantially by three procedures.

1. Producing of the shape giving surface as well as of the entire mold body by aid of a master mold or of a negative, respectively: The master mold is provided with a separating means; thereafter those parts of the mold surface which will not image the later shape producing surface of the mold body to be produced are laminated (this step may also be made at the end); embedding of pneumatic conduits, inserts and similar which are to be formed directly into the porous mold body into the master mold; obtaining an optimal mixing of the mixture consisting of granulated material and binding agent; filling this mixture into the master mold; a layer-wise stamping and oscillating of the mixture filled into the master mold, leaving the mold body inside of the master mold to set and thereafter conducting a heat treatment depending on the granulated material and binding agent having been used; freeing the mold body from the mold, removing the separating agent by a washing or grinding and finally, an annealing for reaching an optimal hardness and/or strength; covering of the outer surfaces of the mold body with the exception of its shape giving surface by a surface layer which shuts off the pores. In this context it shall be noted specifically that because the mold body can be worked mechanically, it is possible to produce conduits for the generation of positive pressure and subatmospheric pressure in the mold body or other armatures also at a later instance.

2. By means of the production steps set forth above a porous form body block of arbitrary shape is produced and the desired shape giving surface is worked thereinto by a mechanical working such as drilling, milling, rotary forming and grinding or polishing, etc.

3. An additional mold body block is placed onto an already existing porous mold body block which preferably is already equipped with the necessary armatures. This additional mold body block may possess a shape giving surface which has been produced by a casting or a mechanical working. The advantage of this third procedure is that the inventive mold body is built up of modules by this procedure. A subatmospheric or cooling module, which contains the necessary armatures, forms a base module which can be reused. Onto this a module is then mounted, an outer module which has a shape giving surface. Both modules are e.g. roughened and connected to each other by means of a suitable mixture consisting of a granulated material and a binding agent. Thereafter, those outer surfaces which are not part of the shape giving surface must be covered by a suitable surface layer. Because the mold body block produced thereby can be machined impeccably mechanically, the module having the shape giving surface can be severed again mechanically at any time.

Due to these three alternatives for producing an inventive mold body the least costly production method can be chosen for each specific use of the mold body. It is thereby possible to decide between mold bodies which are generally available or working tools which are available, etc. Furthermore, the builder of mold bodies has an unlimited possibility to modify or repair the tool without suffering on quality. It is obvious, that by means of such procedure it is possible to produce tools for mold bodies with a small expenditure and which are also suitable for the production of individual pieces such as patterns and prototypes and, not lastly, in view of economical matters.

Specific embodiments of mold bodies can incorporate the following features: Certain areas in the mold body can be formed by low cost, preferably porous filling materials. Furthermore, it is thinkable to use intermediate layers of a coarse grained or coarse porous material. In order to increase the wear resistance specifically in case of sharply edged contours of the shape giving surface a porous metal layer can be applied, for instance by a flame spraying. In order to control the temperature it is possible to arrange heating and/or cooling elements directly within the mold body. Furthermore, guides, mounting elements and similar may be set directly into the mold body. The shape giving surface can comprise recesses. Inserts made out of the same porous material are then placed in these recesses. However, it is possible to use inserts made of straw, bamboo, leather etc. Such recesses can be provided with e.g. different numerals and are easily and arbitrarily often exchangeable. Furthermore, inserts are possible, which can be pulled back into the recesses for freeing a cast body from the mold. Furthermore, use can be made of insets held with aid of inserts in the recesses such to be movable in the direction of freeing the cast body from the mold. This allows to realize mold bodies which usually can be produced only by split molds. Specifically, it is to be noted that the last named variations can be realized only because the porous material consisting of a granulated material and binding agents made in accordance with the teaching of the present invention can be worked mechanically. If such inserts would have to be produced in accordance with common procedures by a casting, the costs would be astronomically high.

In summarizing, the following advantages are attained by the inventive mold body: A fine, surface-dense porosity, with such finely contoured shape giving surfaces and correspondingly fine deformations of foils are possible; extremely fine surfaces are achievable, accordingly no unwanted graining of the foil or structured surfaces must be suffered; due to the impeccably fine distribution of the pores excellent flow characteristics are achieved, such that a high and fast flow through performance, excellent cooling and short production step times of the deep drawing of the foils or casting of casting masses comprising plastic material is made possible; due to the production of molds without any problems the necessary experience regarding the placing of holes or jets, respectively, is no longer necessary, no practical verification tests are necessary; a low cost production of molds specifically from a model is possible, this is true specifically for multiple molds; the smooth, volume dense porosity allows modifications and repair work as well as a later working of the shape giving surface whereby the modified or altered sections of the surface are without exception of a constant quality; and the high mechanical rigidity results in a long usable lifetime and fine contours and thin wall thicknesses are possible therewith.

The following explanations are intended for an elucidation of some of the matters described above.

Specifically, polymer concrete or mortar, respectively, exhibits as structural material the following advantages over cement: The strength is higher, and even the crushing strength is 1.5 times greater; the tensile strength (destruction of the structural material) amounts to being 5 to 10 times higher; the elongation on fracture amounts to be 20 to 100 times higher; the bending strength amounts to be 5 to 10 times higher; the resistance to impact (tenacity) is much higher; reinforcements (inserts) are enveloped extremely precisely and accordingly held perfectly; it is further decisive, that the absorption of water is much smaller and accordingly, the resistance to frost much higher, additionally the resin of the polymeric concrete or mortar, respectively, renders itself suitable to receiving matter glued or bonded, respectively, thereupon and to be clad such that a peeling off of surface cladings after a certain time span, such as in the case of cement, does not exist. Furthermore, the primary energy consumption is about 40% smaller.

The advantage, specifically of polymeric concrete over steel, consists substantially in that the plastic material possesses a vibration absorption (resonance problems) which is six times higher; in that the insulating properties are much higher.

A general advantage consists in that the above mentioned materials exhibit generally a speedy and fast setting of the cast, i.e. in that within a short time span a sufficient hardness regarding the opening of the mold is attained.

Accordingly, there is a great demand on being able to cast these materials because it is the only procedure to economically achieve complicated shapes at all.

However, as soon as an attempt is made to achieve an economical casting procedure, certain drawbacks of the mentioned materials, specifically of polymer concrete or mortar, respectively, come to light. The raw material is substantially more expensive than other materials such as cement or steel; in order to render the production economical, it is thus necessary to provide an economical and automatic casting process. Furthermore, these materials are subject to shrinkage when setting and the shrinking properties augment the problems. The latter depend on the relative components of granulated material and resin; it increases upon a decreasing component portion of granulated material and increasing component portion of resin. If polyester is chosen as binding agent, the shrinking reaches a magnitude of %; in case of epoxy resin the magnitude of pro milles and in case of PMMA a magnitude located between the above extremes. The conclusion is that the shrinking properties pose decisive problems when casting such materials.

The problem regarding the shrinking can be met to a certain extent, in that the cast article is removed from the opened mold immediately after reaching the shape rigidity. It may then be stored in a stable condition and shrink without any further problems in accordance with the prevailing composition of the material.

This shrinking leads to large drawbacks, which until this date have not been overcome economically. In case of casting compounds comprise binding agents or such having a plurality of components to unsightly products: During the casting an initial setting process a certain separation of the components takes place at the surface of the cast compound; the respective component which collects at the surface has a larger shrinking property than such under the surface, i.e. than the cast mass located further within. Correspondingly, fine shrinkage images form on the surface, which as such is smooth; this process is augmented by the parting compound layer which cannot be avoided; the cast mass can easily separate from the mold surface. Such problems are not encountered in other fields of the art, e.g. when cast in concrete, which sets practically without any shrinkage or in case of pressing ceramics.

Materials and mixing apparatuses have indeed been improved over the years; however, due to the above mentioned characteristic properties, specifically of synthetic resin concrete or mortar, respectively, it was however not possible to achieve improvements worth mentioning.

A problem of the conventional casting method is that the setting cast compound bonds to the wall surface of the usually metallic mold. Accordingly, a parting agent layer must be provided between the mold and the cast article. Such can be applied onto the mold face of the mold by a spraying or painting procedure. Such generally known parting agent layers which are sprayed or painted, respectively, onto the mold surface such to facilitate the opening of the mold proved not to be suitable if the cast compound comprises a sharp edged granulated material, e.g. quartz sand, as filler agent. The granulated material which moves along the mold face during the casting proper can locally scratch the parting agent layer completely off, specifically after repeated use. At the areas of the mold face which accordingly are laid bare the influence of the parting agent is eliminated and the cast article may adhere under certain conditions with such a force to the mold face that it can be removed therefrom only by exerting a large force or possibly not at all. Also in case the parting agent layer is being applied onto the damaged areas after every casting, problems arise. After a certain time span the thickness of the parting agent layer on such locations grows to be that large that the cast article will come to display too large tolerances. Also finer scratches in the parting agent layer which as such do not hamper the opening of the mold to a large extent can cause problems: During the setting the cast article is subject to a certain shrinkage. Specifically in case of complicated shapes it is important that the setting cast compound can move somewhat along the mold shape defining the mold face of the mold. If such moving is obstructed due to a local adherence in the mold, detrimental proper stresses may occur in the cast article. Such proper local stresses are specifically undesirable at those places where they are most likely to occur: projections in the mold around which the cast compound must flow are specifically subject to the influence of the granulated material and produce in the cast article depressions which at a later loading are subject to a notch effect.

Specifically the production of articles having an U-shaped section poses great difficulties: Due to the shrinkage which cannot be avoided as such during the setting proper the cast compound counteracts such that the two legs of the U clamp between themselves the section of the mold located therebetween. This clamping leads to a friction such that a too large expenditure on force is necessary when opening the mold that the only semi-set cast article will be damaged. If on the other hand the cast article is led to set completely, the shrinkage and thus the clamping will be that large that as a rule tensile cracks occur already during the setting. A further problem consists in that during the opening of the mold granulated material located in part at the surface scratches the parting agent layer in spite of the shrinking mechanism.

In spite of these problems finely structured and thin-walled articles have been produced of e.g. polymer concrete or mortar, respectively. The corresponding method is, however, extraordinarily extrinsic and uneconomical: The conventional mold, covered by a conventional parting agent layer, must be additionally covered by Gel-coat. This is a synthetic resin liquid, which, when applied over the parting agent layer, forms a setting surface layer in the mold. Correspondingly, the cast article removed from the opened mold possesses then a quite beautiful shiny and bright surface; the overcoming of the shrinking problems must, however, be paid by serious drawbacks: The cast article does no longer consist to 100% of the cast plastic material, it has a surface layer of Gel-coat and its production is very expensive.

The French patent specification FR-PS 2 359 691 discloses a method of producing concrete articles by the aid of a mold casing made of metal profiles. The mold casing is provided with holes, through which air can be drawn off, such that a thermoplastic foil stretched over the mold casing comes to lie against the mold casing walls. Accordingly, a parting layer has been formed on such mold casing which adheres rigidly to the walls thereof and allows a casting of prefabricated concrete articles having an excellent surface quality.

Tests have shown that specifically polymer concrete or mortar, respectively, cannot be cast according to this procedure. Because the parting layer is partly drawn into the holes made in the mold casing and accordingly remains fixedly bonded therein, the necessary albeit small lateral movements cannot be guaranteed with absolute safety. Furthermore, in case of the much finer structured shapes for plastic casting air pockets form at various locations between the foil and the mold surface located between the air holes. Important is also additionally that the shrinking could not be avoided.

CH PS 569 561 discloses n apparatus, in which a parting agent layer in form of a rubber skin is brought to abut the mold surface by means of a subatmospheric pressure. Because the apparatus in question is a press, it is sufficient, if the rubber skin lies against the mold surface prior to an operating step roughly only. A precise abutting of this rubber skin, specifically in case of more complicated shape giving mold surfaces, could not be arrived at in view of the unsatisfactory flow conditions in the mold according to the CH PS 569 561.

The deep drawing techniques which, for instance, produce blister packagings encounter also the problem of impeccably deep drawing a skin or foil. Proceeding from disclosures, such as e.g. FR-PS 2 359 691, wooden molds were produced, which comprise infinite number of bores. Regarding the finely structured and complicated shapes the as such considerable (because single) improvement could not satisfy permanently. Encouraged by the disclosure of the FR-PS 2 359 691 and CH-PS 569 561 an attempt was then made to produce a plastic mold having a satisfactory air draw-off capacity, i.e. having air passages designed with sufficiently large dimensions. The procedure thereto was as follows: According to the desired shape of the article to be produced it was tried to estimate at which locations a specifically high subatmospheric pressure must be produced and accordingly a specifically high drawing-off capacity must be present. Thereafter a master mold was made, into which a large number of nylon threads depending on the desired drawing-off capacity were embedded; thereafter this master mold was filled by casting the desired plastic material, whereupon the (daughter) plastic mold was formed which is necessary for the producing of the workpieces. After the setting the nylon threads were pulled out of this mold such that the sought air channels were available. The articles produced by means of such molds were satisfactory to a certain extent. The expenditure for producing such mold is exceedingly high and additionally such necessitates mold producing personnel having a large experience and a specific feeling for the necessary evacuation capacity. In addition, there always was the danger, that one had to discover on a finally produced mold that the nylon threads and accordingly the air passages did not run optimally.

Proceeding from this prior art it is object of the present invention to overcome the drawbacks described and to provide a method of producing cast articles. The production method shall thereby determine only in a secondary kind the shaping of the cast articles. Furthermore, the cast article shall be impeccably removable during the opening of the mold and comprise a completely smooth not shrunk surface and shall have substantially no internal proper stresses.

For the body of the at least one mold part a unitary mixture of granulated material and binding agents shall be provided. Suitable materials which lend themselves useful as granulated material, depending on the respective material of the compound to be handled are e.g. grains of various metals, e.g. aluminum, steel or cooper. The binding agent is preferably an epoxy resin. The jacket enclosing the body can in the most simple case, specifically in case of small molds, be built up out of a laminate utilizing the same binding agent which is comprised in the mixture used for the mold core. In case of larger molds it is practical to provide an additional under-surface filling or backfilling, respectively, which e.g. can also consist of a synthetic resin concrete or mortar, respectively. All armatures necessary for completing the mold such as e.g. mounting means are preferably cast or laminated, respectively, into the mold or the back-filling layer.

A unitary mixture of granulated material and binding agent obviously does not mean that only one grain size is present in this mixture. The grains of the granulated material are sorted during the production step by a sifting; every mesh size has its tolerances and reference is made hereto to the standards of the producers. A unitary mixture or "substantially even sized grain size" is accordingly to be understood as grains having the same dimensions within a tolerance range such as available from the manufacturer. In this context it shall also be noted, that the terms polymer concrete and mortar, respectively, refer only to the various grain sizes of the material.

Such a mold built up by a substantially even grain size can be worked quite easily at a later instance. Because namely no mold is present which is built up from various layers of materials, there is no danger that during the post-working procedure a pushing through the surface layer is suffered. It is thus conceivable to work new recesses into the surface of the mold or by aid of a shallow recess to anchor newly modeled projections in the shape giving surface, i.e. mold face of the mold. Obviously, in order to improve the tolerances of a cast article the mold face can be smoothened e.g. by means of a grinding procedure.

The solution in accordance with the invention incorporates furthermore the advantage that it can be done away with an applying of a parting agent layer onto the mold face and instead it is possible to provide as a parting agent in the mold a foil of a thermoplastically deformable material, e.g. of polyvinyl chloride or polyethylene which in case of a subatmospheric pressure within the mold body abuts tightly the mold face. In case of a mold having a substantially concave mold face the parting foil is drawn onto the mold face by means of a deep drawing and in case of a mold having a mold face with a substantially convex shape a shrinking foil is used preferably, which adjusts itself under the influence of heat to the mold face. By means of a partial deep drawing of the parting foil it is possible to also impeccably clad small recesses, so-called mold nests, impeccably in the mold face at a correct shaping. For the opening of the mold to extract the article the parting foil can be pushed off the mold face and pressed onto the article by means of a positive pressure within the mold body. It can then be thereafter simply torn off of the article or may remain on the article as a packing. When used as packing the parting foil provides a certain protection against environmental influences, this in contrast to a water soluble parting agent layer which is less suitable for such task. In certain cases, e.g. in case of rough surfaces of the cast article it is additionally quite difficult to completely remove the parting agent layer and the residues render the surface of the article to have an unsightly appearance and render a following surface treatment, e.g. a painting thereof, more difficult. This drawback is also no longer present when a parting foil is used.

It is not only that the parting foil acts so to say as lubricant during the shrinking of the cast article which begins its setting, a decisive advantage results when opening the mold for retrieving articles of a U-shaped cross section: It is possible to remove upon opening of the mold merely semi-set cast articles because the frictional force between the legs and the section of the mold embraced by the legs is substantially decreased. Furthermore, the force for the removing of the cast article during the opening of the mold is not brought to act directly onto the cast article; it is now possible to merely pull the parting foil.

In contrast to other casting methods, in which the mold takes a central position and in which the devices for the operation of the mold, such as drive and guiding means for moving individual mold sections towards each other and away from each other, vibrators and feed lines for a gas or liquid exchange of permanently installed and designed for an operation together with various molds the concrete mixing machine forms e.g. when processing synthetic resin casting compounds the central part of the processing plant, towards which the mold must be moved for receiving the casting compound. A processing plant for this object comprises preferably several stations, at which the mold is subjected to the various operational steps. These may be, for instance: A preparing station, at which the mold is prepared for receiving the casting compound (insertion of the parting foils, moving the molds together, generation of subatmospheric pressure, setting of temperature), a casting station, a polymerization station and a form opening station (pressurizing, parting of the mold parts). Under such circumstances it is suitable to allocate the devices for the operation of the mold permanently thereto such that the mold forms an autonomous casting apparatus, which is transported from station to station together with movable feed lines for the supply of electrical energy and for the feeding and discharging of gaseous and/or liquid mediums.

An embodiment fulfilling this task consists e.g. in case of a mold with at least two mold parts for forming a closed hollow mold is one in which the mold sections are mounted to a movable frame and whereby guiding means for a closing or opening of the hollow mold, means for connecting a generating means of subatmospheric pressure or positive pressure and apparatuses for keeping the mold closed are provided. Additionally, a vibrator may be mounted on the frame.

For the processing of casting compounds containing gas and/or liquids, e.g. for the production of articles of a structural form, molding tools having a metallic mold face are preferred. A metallic mold face which is ground smoothly is also advantageous when using parting foils. A corresponding embodiment of the inventive casting mold can consist in that the mold body comprises at least at an area close to the mold face a filler material consisting of metallic constituents with which a porous metal layer forming the mold face proper is connected.

The mold body can contain totally a metal granulate, e.g. steel-, aluminum- or copper grains. Due to weight and cost considerations, it is however more advantageous in many cases if the mold body has a layer of metal granulate only in an area adjacent the mold face and contains in the balance a nonmetallic granulate, e.g. quartz sand.

In order to manufacture the mold having a metallic mold face the inventive procedure is to initially form the mold body from a mixture of granulated material and binding means, whereafter the mold face of the mold body containing the metal layer is worked mechanically followed by a sand blasting, whereafter the form body is tempered and finally the metal covering applied onto the mold face.

The material for the mold can be present either as prefabricated block, into which the negative form is mechanically worked into or it can be cast in a pasty condition onto the positive form. A mechanical working of the mold face is in any case necessary in order to work out the blank metal of the granulate for the later joining with the metal covering. By means of the sand blasting of the mold face the resin is pushed back or removed, respectively, from the surface.

By means of the tempering following thereafter the necessary stability of the shape or brusting pressure, respectively, of the mold body is achieved, whereby the characteristics (temperature, time, etc.) of the tempering are chosen in accordance with the later use of the molding tool, specifically in accordance with the operating pressure and operating temperature.

As for the metal covering it is possible to use e.g. carbon steel, aluminum or copper, corresponding to the metal granulate of the mold. In order to apply this metal covering onto the mold face use is made preferably of a flame spraying method where the application can be made as one or several layers depending on the desired thickness and porosity. The permeability of the mold is preferably determined by the porosity of this metal layer. If conditions allow, the metal layer can also be applied by a galvanic or electrolytic, respectively, method.

If necessary, the mold face can be subjected to a postworking in e.g. a grinding process.

Molds of the kind described are suitable among others for the producing of articles of Styropore as well as for sand mold parts (cores) for metal casting applications.

In a practical embodiment the mixture for the mold consists of a granulated metal having a grain size of 450 μm and epoxy resin as binding agent in a relative mixture content of 82 parts by weight granulated material to 18 parts by weight resin. The tempering proceeds during 12 hours at a temperature of 130° C., with a pre- and posttempering during six hours, each at 60° C. The thickness of the layer of the metal layer is in the range of 0.1 mm.

The invention relates also to a method of operating the inventive mold for a processing of synthetic resin concrete or mortar, respectively, casting compounds. The processing of such casting compounds necessitates the use of a vibration acting onto the casting compound during the casting process such to make sure that all cavities in the mold are filled completely by the casting compound.

Specifically then if the casting compound is fed into a lower mold part and is to be distributed in the mold by a pressing of an upper mold part thereinto, it has been realized that this distributing by pressure alone cannot be achieved. Plastic compounds of synthetic resin concrete or mortar, respectively, have sometimes such a high viscosity that in case of a pressure which is high enough for an impeccable distribution of the casting compound, the granulated material contained therein would irreparably injure the mold face. It has now been found, that when using imbalance-jarring vibrators of a design which have been used for the handling of unitary molding compounds such vibrators are not suitable for casting of concrete- or mortar mixtures, respectively, because an unmixing of the concrete- or mortar, respectively, constituents is suffered during the casting process such that the vibration leads to an uneven distribution of the filler materials in the article being cast. This is due to the eccentric excitation of vibrations of imbalance-jarring machines, which leads to shapes of the vibrations having central nodal points and amplitudes of vibration which increase with an increasing distance from the nodal points. The higher vibrational excitation of the fill materials which increase from the center radially outwards drives these filler materials to migrate outwards and leads, for instance, in an article in shape of a container to an enrichment of the filler materials at the outer container wall and a corresponding dilution at the inner wall. A separation of the constituents of the mixture can now be avoided in that in accordance with the invention the mold is subjected during the casting process to a vibration having unitary amplitudes of oscillation e.g. exclusive of vertically directed amplitudes. In order to achieve such, it would indeed be possible to use an imbalance vibrating machine if those components of the oscillation which are not vertically directed are sufficiently dampened by additional means. It is, however, more advantageous to use a vibrator having an unitary direction of oscillations.

The direction of the oscillations, the amplitude and the frequency depend thereby on the features of the individual mass or compound, respectively, being cast.

An embodiment of the inventive method for operating a mold including at least two mold parts forming an outer mold and an inner mold which is specifically suitable for the processing of viscous casting compounds consists in that the necessary amount of this casting compound is filled completely in the still open outer mold and in that whereafter the inner mold is pressed into the outer mold whereby the vibration is applied during the displacing of the casting compound.

Figure 5:
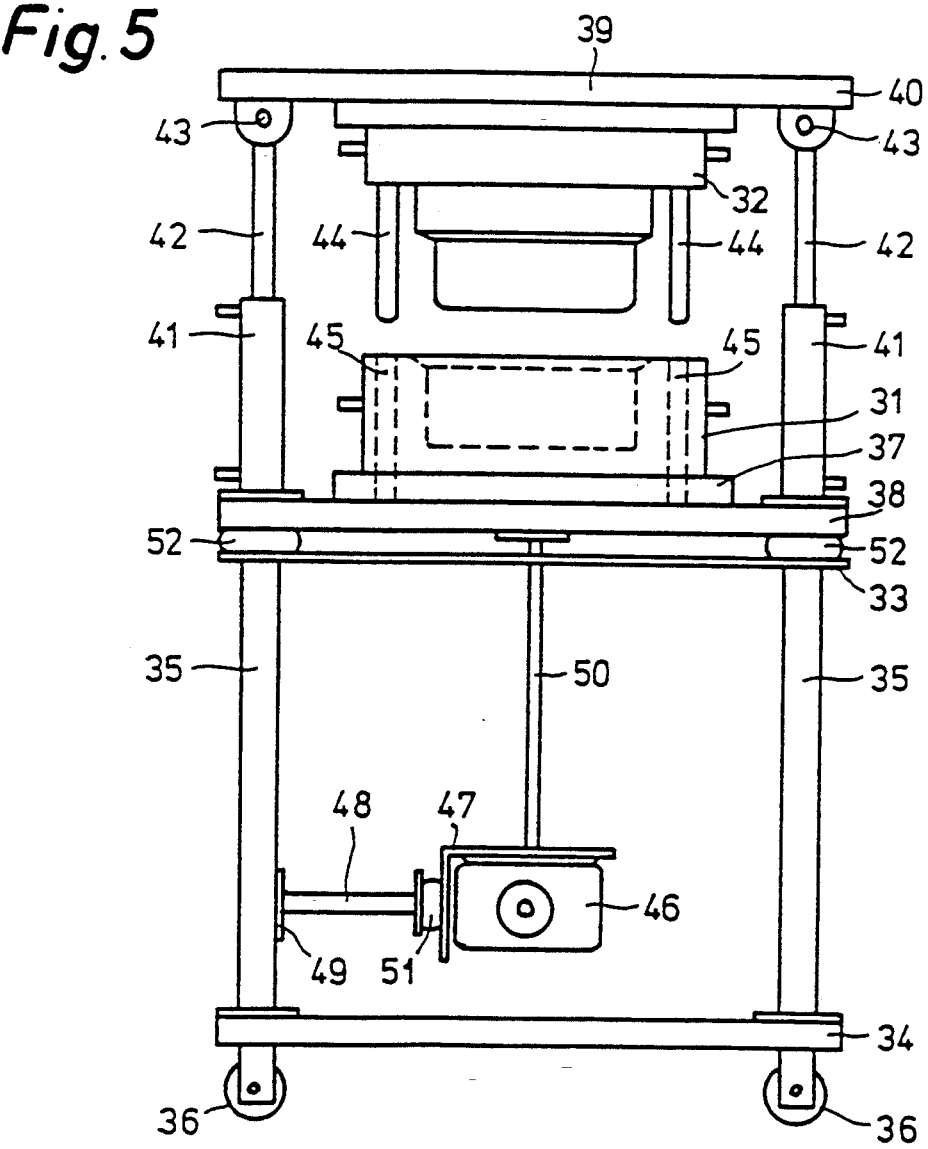

The invention will be explained hereinafter somewhat more in detail based on the embodiments illustrated in the figures. There is illustrated in:

FIG. 1 schematically a two-part mold for the production of e.g. flower boxes,

FIG. 2 schematically a section through a one-piece mold,

FIG. 3 schematically one of the parts of the mold of FIG. 1, whereby its inner structure is shown more in detail, FIG. 4 schematically a further section through a mold in accordance with the invention, FIG. 5 schematically a casting apparatus including a mold in accordance with the invention, FIG. 6 a counter body including the armatures it can be set into the mold.

FIG. 1 illustrates an inventive two partite mold. Illustrated are the mold sections 1 and 2. The mold section 1 possesses a vacuum tube 3 which branches in its inner area into branches 4 and 5. If a subatmospheric pressure is applied at the vacuum tube 3, an air current is generated in the entire porous mold area 6 which enters through the pores of the mold face 8 into the mold, flows therethrough and leaves the mold again via the vacuum tube 3. The outer surfaces of the mold are covered by a surface layer 9 which clogs the pores such that the air can enter only through the mold face 8 into the mold. Quite obviously it is also possible to apply a subatmospheric pressure from the outside onto the mold face 8, whereby however the same flow conditions are present in the mold as described above. It is specifically important that due to the equally distributed fine porosity of the body a practically equally distributed air current exists throughout the mold.

The mold section 2 is shaped as counterpiece to the mold section 1. It contains a pore clogging surface layer 9' as well as a form determining surface 8'. A vacuum tube 3' fulfills the same object as the vacuum tube 3. Although a foil can be deep drawn in each of these mold sections, it is quite obvious that the present apparatus shall serve for a casting of compounds containing plastic material. After the shape determining surfaces 8, 8' are covered by a plastic foil, which is rigidly kept on these surfaces 8, 8' by means of a subatmospheric pressure, e.g. polymeric concrete can be fed into the mold section 1. Because polymer concrete incorporates as a rule an extremely high viscosity, it is advisable not to distribute the polymer concrete mass only by means of pressure upon a bringing together of the mold sections 1 and 2. It has been proven that with the aid of a jarring having only one direction of its oscillations this leads to the best distribution of the polymer concrete mass.

After the cast article has begun to set, the mold can be opened. The easiest procedure is to apply a positive pressure via the vacuum tubes 3, 3', which lifts the foil designed as parting agent layer from the shape giving surfaces 8, 8'. Specifically in the case of the mold section 2 it is, however, advantageous if the cast article which has begun to set is pulled off by aid of the foil which projects over the mold section at the edges thereof. After an initial lifting off of the cast article from its shape giving surface, here the surface 8', it is namely possible that leaks are generated such that an applying of positive pressure is of no avail.

FIG. 2 illustrates schematically an embodiment of a mold having a plurality of sections and a very complicated designed shape giving surface 8. Quite obviously a further mold section could be inserted in order to give the article being cast such as illustrated in the example of FIG. 1 a e.g. U-shaped cross section. The porous mold mass 6 extends not completely through the entire cross section of the mold 10. Because certain granulated materials, e.g. aluminum-or copper grains, are quite expensive, a filler material may be used in the areas 11 and 12. Possible is, for instance, sand or a foamed material. Important is, however, that the shape giving mold face 8 is surrounded such by an area of porous material that an impeccable air flow can exist through the pores into the branches 4 and 5 of the vacuum tube 3. It shall be noted clearly, that with regard to the positioning of the vacuum tube 3 including its branches 4, 5 a large range of tolerances exists due to the extremely good flow features of the porous material mixed in accordance with the invention. No specific knowledges or experienced values are necessary, therefore, in order to place the subatmospheric armatures in the mold. Further illustrated are recesses 13, 14 and 15 in the shape determining mold face 8. Because these recesses are worked into the porous material, their surfaces do not differentiate from the surfaces of the rest of the shape giving mold face 8. This is extremely important because air must flow through the surface sections of the recesses 13, 14 and 15 in the same magnitude as it flows through the shape giving surface 8. An insert 16 is placed in the recess 13. This insert comprises an individual surface section 16'. An insert 17 is placed in the recess 14. This insert 17 comprises an individual shape giving mold face surface section 18. Because the surface section 18 has laterally extending recesses, an opening of the mold and a retrieving of a cast article would not be possible if the insert 17 upon opening of the mold could be moved out of the mold 10. An insert 19 is placed in the recess 15. This insert comprises an individual surface section 20. This surface section comprises also a laterally extending recess such that when opening the mold for retrieving the article, the insert 19 must be pulled into the recess 15. This lateral shifting can be accomplished by means of the lever 21.

It is obvious, that by means of the above described inserts not only extremely complicated article shapes are made possible but also that at the same time the parts of certain article series can be individualized singly or in certain numbers. The insert 16 may, for instance, be provided at its shape determining surface section 16' with numerals.

It must be borne in mind that when deep drawing the foil 22 an impeccable abutting of the latter must also happen on the shape determining surface sections 16, 18 and 20. This is only then possible when the inserts 16, 17 and 19 are fitted exactly in their recesses. Furthermore, the flow conditions at the border areas between mold body proper and inserts must be exactly the same as prevailing in the rest of the mold body. These conditions are fulfilled only then if the density and quality of the pores at the surfaces of the inserts and of the recesses are exactly the same as those of the rest of the mold body. This again could be achieved only because the porous material of the mold can be worked mechanically; it is only in this way that it is possible to produce with a sensible expenditure the inserts, the recesses and to fit them in with a smallest tolerance.

This results in a further reason which makes it necessary to maintain the uniform density of the pores and the quality which is possible in accordance with the invention along the shape-determining surface. The foil, which is heated by the heating apparatus 28, must not only have been drawn down at lightning speed against all shape determining surface sections but also must be pulled down evenly. If such does not proceed evenly a local overly strong thinning of the foil will be suffered at singular locations while other locations pleats could be generated. This leads not only to a uniform through flow of the pores of the shape determining surface 8, but also a very high drawing off output of about 80 liters per square meter and second. Such a drawing off output simultaneous together with very fine pores and smooth shaped determining surface could until today not be produced as yet.

FIG. 2 illustrates, furthermore, means 23 for holding the foil. These are shaped as square cubes which are sunk into the mold and extend along the edge of the shape determining surface 8. Preferably one surface section of the profiles 23 is to be located to just run along the surface of the mold. The holding of the foil proceeds as follows: A foil 22 is placed over the mold. Thereafter a subatmospheric pressure is applied at the profiles 23, 23, such that an air flow is generated which flows from the outside through the openings 24 into the profiles 23. The foil 22 is therewith drawn onto the profiles 23 and thus held by such. As soon as the holding has become reliable, the heating 28 for heating the foil 22 can be switched on. Under certain conditions it is advisable to support the foil by applying some positive pressure through the tube 3 until it has softened completely. As soon as the foil 22 has been heated up, a subatmospheric pressure is applied at the tube 3; the foil 22 will then come to contact within seconds the shape determining surface and will envelop impeccably the finest contours thereof. Quite obviously it could be thought to provide from the outside a positive pressure such that merely displaced air is discharged through the tube 3.

FIG. 3 illustrates a further mold which is similar to the mold section 2 of FIG. 2. Decisive is, that this mold consists of a plurality of layers. The vacuum tube 3 including its holes 25 is embedded in a porous layer 26, which comprises grains of a granulated material, either of a cheap filler material such as sand or with specific features, e.g. having a small weight. Decisive is again that the good flow conditions through the border surfaces between the layers are not disturbed.

FIG. 6 illustrates a mold body 66 having a counterbody 67. The counterbody 67 consists hereby of a porous material and comprises a pore clogging surface layer 9 as well as connections 3 and 68 for the subatmospheric pressure and further armatures, respectively. In this way it is possible to achieve an air flow from the outside through the inner surfaces 69 into the connection 3 to the subatmospheric pressure. If now the mold body 66 is inserted into the counterbody 67 such that the surfaces 69 and 69' which correspond to each other come to lie on top of each other, a through flow effect from the shape determining surface 70 of the mold body 66 through the counterbody 67 to the vacuum tube 3 is achieved such as if the border surfaces 69, 69' would not be present at all. It is immediately obvious that it is possible to produce a large variety of mold bodies 66 quite cheaply by this procedure and that always again one and the same countermold body 67 can be used. The producing of a mold for a deep drawing or for a casting of castable compounds including a plastic material portion will, therefore, be quite economical. This again is possible because the density and quality of the pores in the surfaces 69, 69' is present in spite of the necessary working for an impeccable fitting on to each other.

It would, furthermore, be conceivable to place the mold body 66 onto a counterbody 67 shaped as simple block. In such case, the surfaces of these two bodies which are placed upon each other must be roughened somewhat and interconnected by means of a layer of a granulated material and a binding agent. This works without any further ado because the density and quality of the pores is maintained also after the roughening. After use, the mold body 66 proper can be severed from the counterbody having the armatures by a sawing. Below, some further items will be explained more in detail with reference to FIGS. 4-6.

The molds according to FIG. 4 form two casting molds, namely an outer mold 51 and an inner mold 52 such to form a hollow mold, for instance, for the production of plant boxes of synthetic resin mortar. Each mold body comprises a section 53 and 54, respectively, of a porous synthetic resin mortar which is penetrable up to the mold face 55 and 56, respectively, and a core having a jacket 57 and 58, respectively, which seals gastight towards the outside. The synthetic resin mortar is, for instance, a mixture of a granulated aluminum and an epoxy resin and the mold face 55 and 56, respectively, is formed by a porous aluminum layer. The jacket 57 and 58, respectively, consists of a laminate having epoxy resin as binding agent. In order to allow the gas exchange from and to the mold faces 55 and 56, respectively, several through openings are foreseen in the jackets 57 and 58, respectively, which are formed by pipe sections 59 and 60, respectively, cast and laminated into the mold body. These pipe sections can be provided with coupling means, e.g. rapid couplings for the coupling of hoses for a connecting of the mold body sections 53, 54 to a source of positive pressure or subatmospheric pressure. These and further devices, e.g. foundations with mounting means, which complete the molds 51 and 52, are not illustrated in the drawing.

Prior to the casting process the mold bodies 53 and 54 are provided with separating foils of a thermoplastic material which in case of subatmospheric pressure in the mold bodies will tightly lie against the mold faces 55 and 56. After the casting process, i.e. when opening the mold for extracting the article, the separating foils are pushed off tee mold faces by a positive pressure within the mold body. The casting process is made in this embodiment, in that the necessary amount of casting mass is filled completely in the still open outer mold 51 and in that thereafter the inner mold 52 is pressed into the outer mold 51 until the hollow mold is closed.

The through openings in the jacket of the mold body, e.g by the outer mold, are preferably located such that specific subatmospheric zones are created at those locations where so-called mold nests are present, which subatmospheric zones can be brought to act, after the drawing of the separating foil onto the parts of the mold face having a large area, additionally in order to pull the separating foil completely into these nests of the mold.

FIG. 5 illustrates schematically a completely assembled mold for an application in a production line. The casting molds 31 and 32, which form together a hollow mold roughly in accordance with FIG. 1, are located on a frame, which comprises a mobile foundation. This foundation consists of an upper frame 33, a lower frame 34, four corner supports 35 and rolls 36. The casting mold 31 is mounted at its base 37 onto a lower platform 38 resting on the upper frame 33 of the base frame and casting mold 32 is mounted via its lower base 39 to an upper platform 40. Hydraulically or pneumatically operated operating cylinders 41 interconnect the two platforms 38 and 40 and are operative for the opening and the closing of the hollow mold as well as to keep it shut. At the upper platform 40 the connection to the operating cylinder, i.e. to its piston rods 42, consists of a detachable pivot bearing 43, such that the upper platform 40 can be pivoted together with the mold 32 selectively up at the one or the other side, to which end the connection of the pivoting bearings must be detached at one side. In order to interconnect the two casting molds to form the hollow mold they are provided with guides and specifically mandrels 44 are formed into the casting mold 32 which cooperate with ball boxes 45 formed into the casting mold 31.

A vibrator is foreseen for the operation of the mold. The present embodiment includes here a common imbalance-jarring apparatus 46 having an angled pedestal 47, which is mounted via a web 48 to a girder 49 interconnecting to corner supports 35 and is connected further by a force transmitting member 50 to the lower platform 38. This allows to generate a vibrating of the closed hollow mold including the casting compound during the casting process. In order to make sure that only such vibrations are transmitted to the platform 38, which have unitary, for instance, vertically directed vibration amplitudes, rubber dampers 51 and 52, respectively, are provided between the base 47 of the imbalance-jarring apparatus 46 and the web 48 on the one hand and between the upper frame 33 and the lower frame 38 on the other hand, which dampen all vibrational amplitudes which have another direction such that they have practically no influence. In case of the imbalance-jarring apparatus 46 it would be possible to provide a jarring apparatus having a unitary direction of oscillations directly on one of the platforms 38, 40.

The described casting molds are suitable for the processing of polymers and kinds of concrete and mortar having all commonly used synthetic resin binding agents as well as for foamed materials, gypsum and similar nonmetallic materials for the production of articles of use, of sanitary articles, technical articles and other molded articles.

I claim:

1. Method for producing a porous mold body for making a mold, comprising:

shaping a mixture of metallic particles and resin into a uniformly porous homogeneous, unstratified block, wherein said metallic particles are of irregular shape and the size of said metallic particles is selected such that in said mixture particles of a size through the whole particle size range of 10 μm to 450 μm are provided;

curing said resin;

forming a shape determining gas permeable mold face surface on the unstratified block, said surface having a plurality of pores, by mechanically machining said shape determining mold face surface to a desired shape, wherein a porosity of said mold face surface remains intact during machining; and, covering a plurality of remaining surfaces of the block to make them gas impermeable.

2. The method of claim 1 further comprising the step of assembling said mold body from several uniformly porous, homogenous, unstratified blocks.

3. A method for producing a porous mold body, comprising the steps of:

shaping a mixture of metallic particles and resin into a uniformly porous, homogenous, unstratified block, wherein said metallic particles are of irregular shape and have a size ranging from approximately 10 μm to approximately 450 μm;

forming a shape determining gas permeable mold face surface on said body;

curing said resin; and, mechanically machining said shape determining mold face surface, wherein said mold face surface remains porous after said step of machining.

4. The method of claim 3 further comprising the step of covering another surface of said body to render such another surface gas impermeable.

5. The method of claim 3 further comprising the step of assembling said mold body from several uniformly porous, homogenous, unstratified blocks.

6. The method of claim 3 further comprising the step of inserting a fluid flow conduit into said unstratified block before said step of curing.

7. The method of claim 3 further comprising the step of tempering said body after said step of mechanically machining said body.

* * * * *